US008639596B2

(12) United States Patent
Chew

(10) Patent No.: US 8,639,596 B2
(45) Date of Patent: Jan. 28, 2014

(54) AUTOMATED ACCOUNT RECONCILIATION METHOD

(75) Inventor: Peter A. Chew, Albuquerque, NM (US)

(73) Assignee: Galisteo Consulting Group, Inc., Albuquerque, NM (US)

( * ) Notice: Subject to any disclaimer, the term of this patent is extended or adjusted under 35 U.S.C. 154(b) by 0 days.

(21) Appl. No.: 13/200,880

(22) Filed: Oct. 4, 2011

(65) Prior Publication Data

US 2013/0085902 A1    Apr. 4, 2013

(51) Int. Cl.
*G07B 17/00* (2006.01)
*G06Q 40/00* (2012.01)

(52) U.S. Cl.
CPC ..................... *G06Q 40/10* (2013.01)
USPC ............................ 705/30; 707/748

(58) Field of Classification Search
CPC .......................... G06F 17/30864; G06Q 40/10
USPC .......... 705/14, 30; 707/3, 101, 803, 1, 6, 748; 714/49
See application file for complete search history.

(56) References Cited

U.S. PATENT DOCUMENTS

| 7,895,094 | B2 | 2/2011 | Tandon |
| 7,970,668 | B2 | 6/2011 | Ahluwalia |
| 8,019,739 | B2 | 9/2011 | Adelson |
| 2003/0195836 | A1* | 10/2003 | Hayes et al. ................... 705/37 |
| 2005/0273452 | A1* | 12/2005 | Molloy et al. ...................... 707/1 |
| 2006/0136585 | A1* | 6/2006 | Mayfield et al. ............. 709/224 |
| 2008/0208820 | A1* | 8/2008 | Usey et al. ........................ 707/3 |
| 2009/0089263 | A1* | 4/2009 | McHugh et al. .................. 707/3 |
| 2009/0234869 | A1* | 9/2009 | Azvine et al. ................. 707/101 |
| 2009/0265230 | A1* | 10/2009 | Plachouras et al. ............. 705/14 |
| 2010/0185685 | A1 | 7/2010 | Chew |
| 2012/0123913 | A1* | 5/2012 | M .................................... 705/30 |
| 2012/0330971 | A1* | 12/2012 | Thomas et al. ............... 707/748 |

OTHER PUBLICATIONS

Chew and Wilson. To appear. Using computational techniques to solve the inexact-rounding problem.
Chew, Bader, Helmreich, Abdelali, Verzi. 2011. An information-theoretic, vector-space-model approach to cross-language information retrieval. JNLE 17(1):37-70, Jan. 2011.
Chew and Bader. 2010. Algebraic techniques for multilingual document clustering. In Berry and Kogan (eds.), 2010. Text Mining: Applications and Theory. Chichester, UK: Wiley.
Wilson and Chew. 2010. Term weighting schemes for Latent Dirichlet Allocation. In Proceedings of NAACL-HLT 2010, 465-473.

(Continued)

*Primary Examiner* — Ryan Zeender
*Assistant Examiner* — Hunter Wilder

(57) ABSTRACT

Disclosed is a generalized method for automated account reconciliation capable of matching transactions in one accounting dataset to transactions in another accounting dataset with little initial data preparation. The method is highly flexible in that it does not require source data in a particular format, can accept both structured and unstructured (e.g. descriptive text) data as input, is not domain- or language-dependent, and requires little to no training or user-provided heuristics. The method is also adjustable depending on a user's tolerance of error. Based on probability and information theory, computational linguistics, and statistics, the method can complete accounting reconciliation problems in significantly less time than is possible manually, and with just as high accuracy. Especially for large reconciliation problems, the method can save an overwhelming portion of the cost associated with this kind of task in the past.

11 Claims, 3 Drawing Sheets

(56) References Cited

OTHER PUBLICATIONS

Chew and Bader. 2009. Using DEDICOM for completely unsupervised part-of-speech tagging. Proc. NAACL-HLT 2009 workshop on UMSLLS, 54-62.

Chew. 2009. Multilingual text mining. In Wang (ed.), 2009. Encyclopedia of Data Warehousing and Mining, 2nd Edition, 1380-1385.

Chew, Bader, Abdelali. 2008. Latent morpho-semantic analysis: multilingual information retrieval with character n-grams and mutual information. Proc. COLING 2008, 129-136.

Bader and Chew. 2008. Enhancing multilingual Latent Semantic Analysis with term alignment Information. In Proceedings COLING 2008, 49-56.

Chew and Abdelali. 2008. The effects of language relatedness on multilingual information retrieval: a case study with Indo-European and Semitic languages. Proc. CLIA,1-9.

Chew. 2000. A computational phonology of Russian. D.Phil. dissertation, University of Oxford.

\* cited by examiner

| Account | Date | Description | $ |
|---|---|---|---|
| XY001 | 4/10/03 | Cash receipt for W. A. Mozart, 506221A | 50.00 |
| XY001 | 5/13/03 | Cash receipt for Johannes Brahms, check # 10243340, 506224X | 50.00 |
| XY001 | 6/11/03 | Cash disbursement to J. Brahms | -50.00 |
| XY001 | 7/24/03 | Cash disbursement Wolfgang Mozatr 506221A | -50.00 |
| PQ002 | 1/17/08 | Receipt re Johann S. Bach 0034X012 Thomasschule Hillerstr. 7, 04109 Leipzig | 70.00 |
| PQ002 | 2/2/09 | Payment to Emanuel Bach 0034X078 Schreberstr. 14, 04109 Leipzig | -70.00 |

FIG. 4

|  | $t_1$ | $t_2$ | $t_3$ | $t_4$ | $t_5$ | ... | $t_n$ |
|---|---|---|---|---|---|---|---|
| $t_1$ | 1.000 | 0.357 | 0.899 | 0.585 | 0.206 | ... | 0.325 |
| $t_2$ |  | 1.000 | 0.413 | 0.107 | 0.001 | ... | 0.277 |
| $t_3$ |  |  | 1.000 | 0.650 | 0.186 | ... | 0.655 |
| $t_4$ |  |  |  | 1.000 | 0.254 | ... | 0.219 |
| $t_5$ |  |  |  |  | 1.000 | ... | 0.873 |
| ... |  |  |  |  |  | ... | ... |
| $t_n$ |  |  |  |  |  |  | 1.000 |

FIG. 5

|  | $t_1$ | $t_2$ | $t_3$ | $t_4$ | $t_5$ | ... | $t_n$ |
|---|---|---|---|---|---|---|---|
| $t_1$ | ~~1.000~~ | ~~0.357~~ | 0.899 | 0.585 | 0.206 | ... | ~~0.325~~ |
| $t_2$ |  | ~~1.000~~ | 0.413 | ~~0.107~~ | ~~0.001~~ | ... | ~~0.277~~ |
| $t_3$ |  |  | ~~1.000~~ | 0.650 | ~~0.186~~ | ... | 0.655 |
| $t_4$ |  |  |  | ~~1.000~~ | 0.254 | ... | ~~0.219~~ |
| $t_5$ |  |  |  |  | ~~1.000~~ | ... | 0.873 |
| ... |  |  |  |  |  | ... | ... |
| $t_n$ |  |  |  |  |  |  | ~~1.000~~ |

AUTOMATED ACCOUNT RECONCILIATION METHOD

BACKGROUND OF THE INVENTION

1. Field of the Invention

The present invention relates to a generalized method for automated account reconciliation which can be used to match transactions in one accounting dataset to transactions in another accounting dataset. It is based on advanced machine learning (or artificial intelligence) and statistical algorithms and can be applied to data in any format.

2. Description of the Prior Art

U.S. Pat. No. 7,895,094 describes a global account reconciliation tool which provides standard templates for entering transaction and account data, allowing for more ready discovery of open (i.e., unreconciled) accounting items. Once data is brought into these templates, the tool provides for either (1) auto-matching functionality relying on user-defined business rules, or (2) manual reconciliation.

This tool is limited to working with data which has been fitted into the templates it embodies, and any automation of the reconciliation process is not inherent to the tool, but relies on heuristics provided by the user. For the user, the process of installing and learning how to use the tool, and defining business rules could be time-consuming enough to outweigh the efficiencies of automated reconciliation. Furthermore, the accuracy of reconciliation results depends heavily on the suitability of the heuristics embodied in the user-provided business rules. This in turn makes the tool dependent on the expertise of the user in formulating heuristics.

U.S. Pat. No. 7,970,668 discloses a system and method for automated comprehensive reconciliation processing. This invention includes the maintenance of an automated checklist of the various reconciliation steps, enabling maintenance of an audit trail and generation of metrics.

This method does not automate the actual matching of items in one dataset to items in another, but instead is essentially a tracking system allowing an analyst to ensure that data is complete and that all necessary reconciliation steps are duly completed. The most time-consuming part of account reconciliation, for datasets of any reasonable size (upwards of thousands of records), is the process of actually matching data from one dataset to another. Therefore, for such datasets, this method is unlikely to achieve significant efficiency and time-saving in the area where it matters most.

U.S. Pat. No. 8,019,739 discloses a method and system for an on line-like account processing and management. This method processes otherwise batch files using a pseudo-on line transaction processing (OPT) technique and is geared towards increasing the availability of data.

Again, this method does not automate the actual matching of items from disparate datasets, which for reconciliation problems of any significant size is the most time-consuming and labor-intensive part of the process, even if data is available real-time. Therefore, for such datasets, this method is unlikely to achieve significant efficiency and time-saving in the area where it matters most.

SUMMARY OF THE INVENTION

The present invention is a computer-implemented generalized method for automated account reconciliation capable of matching transactions in one accounting dataset to transactions in another accounting dataset. It does not rely on data being provided in any specific template or format, and can be used with structured data (for example, categorical or continuous data provided in the fields of a database or spreadsheet) or unstructured data (for example, text data such as 'free-form' transaction descriptions, in any human language, which might also be provided in the fields of a database or spreadsheet). Using principles from information theory, probability theory, natural language processing, machine learning (or artificial intelligence), data mining, record linkage, candidate matches between items (transactions) in one dataset and those in another dataset are identified. Using principles from statistics and probability theory, candidates are then either ruled in, if the similarity between items in a pair is too high to have occurred by chance, or ruled out in other cases. The present invention can be used to automate matching that is would otherwise be done manually, saving most of the labor for large reconciliation projects. The quality of manually-performed reconciliation essentially cannot be known without reviewing the manual output and measuring against some benchmark, and additionally it is highly unlikely that human-performed reconciliation would ever be error-free. Since the present invention for automated reconciliation is based on principles from statistics, on the other hand, it is possible to judge in advance the likely error rate, since these are specified in the confidence threshold which is one of the settings in the present invention. A system based on this invention can therefore be calibrated to achieve 95%, 99%, or any other desired accuracy level.

It is therefore a primary object of the present invention to provide a generalized method for automated account reconciliation which will significantly streamline the process of reconciling financial accounts at a significant savings.

It is another object of the present invention to provide a generalized method for automated account reconciliation which can easily be adapted to use with transactional data in different formats, to eliminate the necessity for a user of the invention to manipulate data into a required format before it can be reconciled, saving the user of the invention time in its use.

It is a further object of the present invention to provide a generalized method for automated account reconciliation where the user of the invention is not required to develop heuristics or business rules in order for automated account reconciliation to be made possible, again saving the user of the invention time in its use, and eliminating requirements for user expertise.

It is still a further object of the present invention to provide a generalized method for automated account reconciliation which can deal with unstructured data, in cases where key information on each transaction may be included within a transaction description rather than in structured data fields; the invention does not make any presumptions about which human language or character set (e.g. English, French, Russian) is used to encode the unstructured data.

It is still a further object of the present invention to provide a generalized method for automated account reconciliation which can be known in advance to produce measurably reliable results.

It is still a further object of the present invention to provide a generalized method for automated account reconciliation which can, after reconciling datasets, produce reports showing 'open' (unreconciled) items as well as matched items, including the groupings of matched items.

These and other objects of the present invention will become apparent to those skilled in this art upon reading the accompanying description, drawings, and claims set forth herein.

BRIEF DESCRIPTION OF THE DRAWINGS

Non-limiting and non-exhaustive embodiments of the invention are described with reference to the following figures.

FIG. 4 shows the output of computations of pair wise similarity for all pairs of transactions using the cosine measure, where each transaction is treated as a vector of point wise mutual information measures.

FIG. 5 shows the output of ruling out certain pairs of transactions in cases where the similarity between their respective distributions does not meet a required statistical threshold, meaning that the similarity could simply have occurred by chance.

DETAILED DESCRIPTION OF THE INVENTION

Figures 1, 2:
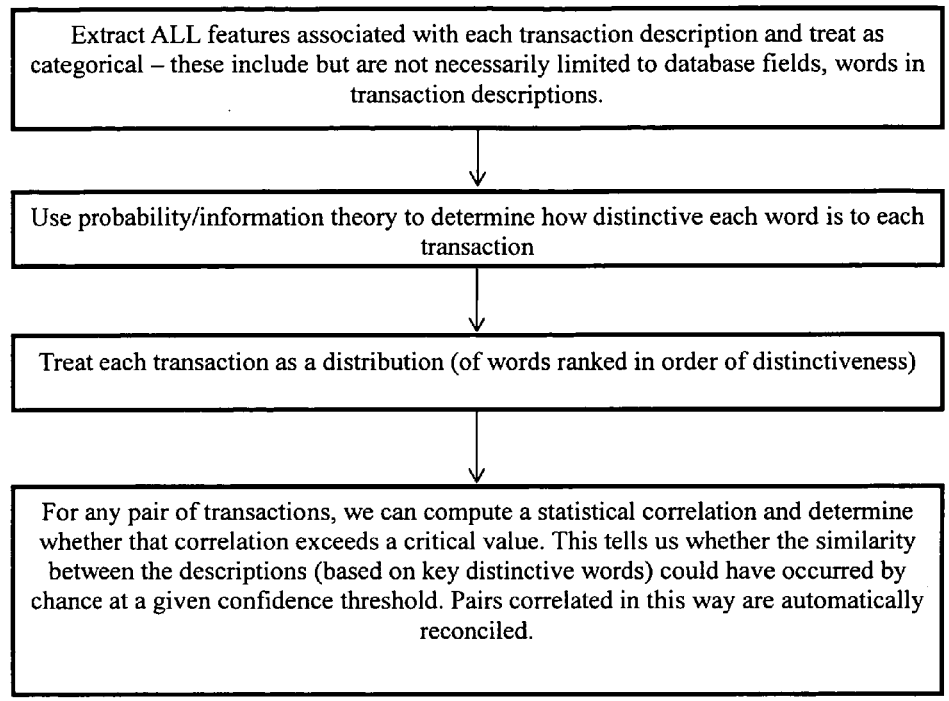
FIG. 1 shows an overview of the process used for generalized automated account reconciliation.
FIG. 2 shows example transactions that might be used as input for the present invention.

FIG. 1 shows an overview of the best mode contemplated by the inventor of the process for generalized automated account reconciliation according to the concepts of the present invention. As can be amply seen from FIG. 1, the process begins with extracting features of each transaction description and is highly general in what can be allowed as input. The 'features' can include items self-contained within a single field of a database table, spreadsheet, or delimited file, such as a transaction date, fund number, account number, or other potentially distinguishing characteristic. They may also include items included in a larger grouping all within a single field; an example would be individual words within a transaction description, all of which is contained in a single free-form text field. Often, it is essential to extract features of the latter type, as in some cases the only place where key identifying information for a transaction can be found may be within a transaction description, as is amply seen in the example shown in FIG. 2 of the drawings. As long as each transaction has at least one feature, there is no theoretical lower or upper limit on how many features may be extracted.

For extraction of words from a transaction description (or other unstructured text), a text tokenizer is required. An example of a preferred method for text tokenization would be the regular expressions Regex.Split method used in conjunction with "\w" (the non-word character delimiter), which can be applied to virtually any human language encoded in any Unicode script. If the source transactional data is in a Microsoft SQL Server 2005 or 2008 database (available from Microsoft Corporation, Redmond, Wash.), then a highly efficient way of tokenizing text fields is to implement the regular expressions method above within a Common Language Runtime database function which can then be referenced within an SQL (Structured Query Language) database query. Within other database management systems, there are likely to be equivalent methods for text tokenization. The text tokenizer converts text within transaction descriptions from the format shown in FIG. 2 to a format where each word within the text is a separate feature; the latter format is highly amenable to further data manipulation. The conversion process (inter alia) is shown in FIG. 3 of the drawings.

Figure 3:
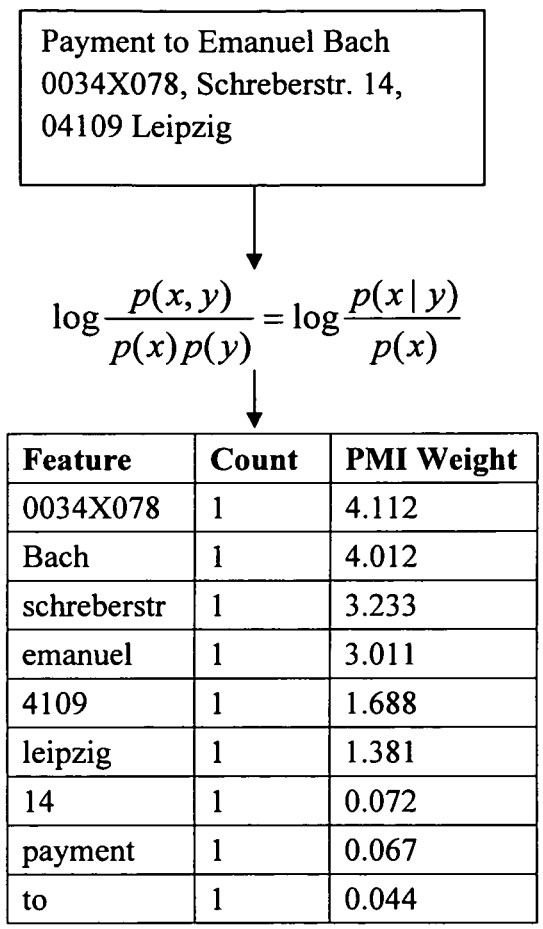
FIG. 3 shows how characteristics or features of transactions, here the words in a transaction description, may be weighted using the point wise mutual information measure from the field of computational linguistics.

While FIG. 3 focuses on the extraction of words from text, rows can be added to the table of features for each transaction to include not just words, but any characteristic of the transaction, such as account, date, fund number, or any other field which may allow transactions to be reconciled. As long as each transaction has at least one feature, there is no theoretical lower or upper limit on how many features may be included.

The generalized method for automated account reconciliation incorporates the use of a weighting scheme based on information theory to measure the distinctiveness of particular features (to include words from text or other features) in particular transactions. An example of a preferred weighting scheme would be Point wise Mutual Information, which can be defined as the probability of feature i in (or conditional upon) transaction j, divided by the probability of feature i occurring in the entire population. In effect, this weighting scheme calculates how much more likely a feature is to occur in conjunction with a particular transaction than may be expected on the basis of chance. A formula for Point wise Mutual Information is shown in FIG. 3, along with sample results of applying this weighting to features from tokenized text. The most distinctive features (including words) for the transaction are assigned higher weightings, while features which are non-distinctive are assigned lower weightings. Use of a weighting scheme in this fashion is resilient to typographical and other encoding errors in the source data, and will automatically recognize which features are most distinguishing within a particular population, without any a priori knowledge of the characteristics of the population. This is a key reason that the present invention is highly generalizable to different datasets.

Once the transaction features are extracted and weighting is assigned, the generalized method for automated account reconciliation conceives of the transactions as being associated with n-dimensional vectors in a Euclidean space, where n is the number of distinct features in the entire population. For a particular transaction, the n-dimensional vector is the list of features, each associated with the Point wise Mutual Information value for that feature. This conception allows similarities between pairs of transactions to be calculated using a geometric measure. An example of such a geometric measure is the cosine metric used in the field of Information Retrieval, which can range between −1 and +1. A cosine of +1 indicates that the vectors for the pair of transactions are perfectly aligned with one another, a cosine of 0 indicates that the vectors are completely orthogonal to one another, and a cosine of −1 indicates that the vectors are perfectly negatively aligned. Thus, a higher cosine between a pair of transactions indicates that the pair is more similar to one another. FIG. 4 illustrates the results of measuring cosines between all pairs of transactions in a population. The cosine between a vector and itself is always 1, as is amply seen in the diagonal row of FIG. 4. The values are not shown in the lower-left half of FIG. 4, as these would be the mirror image of those in the top-right half. Note that use of the cosine metric allows matches to be made between pairs even if the matches are not based on 'hard' criteria; in other words, this part of the process assigns each pair a measure of greater or lesser similarity, rather than saying that a pair 'is similar' or 'is not similar'. Furthermore, the cosine metric can be applied equally regardless of the underlying extracted features.

In FIG. 4, the size of the table of all candidate pairs is determined by the Cartesian product of the two datasets being compared. In cases where the number of transactions is large, a 'blocking' strategy (as in the field of Record Linkage) can be used to subdivide the datasets, thereby reducing the overall number of computations that have to be made. An example of an appropriate blocking strategy would be to rule out pairs where the monetary amounts are not equal and opposite.

To complete the process of automated account reconciliation, a mechanism is needed for deciding which candidate pairs of transactions should be ruled in (reconciled) or ruled out. An example of a preferred method for achieving this is to treat each transaction now as a statistical distribution; this allows a determination of whether pairs of distributions are too similar for the similarity to have occurred by chance. In FIG. 3, the list of features and values (as shown in the output) would be an example of such a distribution. In order to rule a particular pair in or out, any of a number of statistical correlation functions (including but not limited to chi-squared, Pearson's rho, Spearman's rho) may be applied. In the present invention, the measure of correlation is compared to a table of critical values appropriate for the correlation measure. The number of degrees of freedom is the number of independent features used to compute the correlation. If the measure of correlation exceeds the critical value at a predefined confidence threshold (which can be set and/or varied by the user), then the candidate pair is ruled in (that is, the pair of transactions is reconciled), otherwise it is ruled out. If, for a particular transaction, there are multiple candidates for which the correlation exceeds the critical value, then the pair for which the vectors has the highest cosine can be ruled in and the remaining pairs ruled out.

Once decisions have been made on which items to reconcile, the method allows for a means of reporting matched pairs and unmatched items. One means of accomplishing this is to store all data in database tables which include additional fields to encode which items are reconciled to which other items. If this field is blank, the item is unreconciled. For those skilled in the art, it is then clear that reports of reconciled and unreconciled items can easily be generated and rendered to a display by designing queries as needed, for example using Structured Query Language.

The processes explained above may constitute computer-executable instructions embodied or stored within a machine-readable storage medium, that when executed by a machine will cause the machine (e.g. computer, processor, etc.) to perform the operations described. Additionally, the processes may be embodied within hardware, such as an application specific integrated circuit ("ASIC") or the like.

A machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g. read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

The problems addressed by the generalized method for automated account reconciliation are many as can be easily seen by those skilled in the art. The generalized method for automated account reconciliation is not restricted to working with data in a particular format or even text in a particular human language. It is not limited in terms of the number or type of features that transactions may have. It is not limited by size of dataset, and in fact is anticipated to provide increasingly greater efficiencies and savings with larger datasets. It avoids the need for heuristics specific to particular datasets. Through the connection with statistics, it can be reliably estimated in advance, by setting particular confidence thresholds, how accurate the results are likely to be. The present invention can dramatically reduce the amount of labor, and therefore the costs, associated with account reconciliation, particularly on a large scale. Since account reconciliation is a function performed by virtually every accounting department of every organization, the present invention has widespread uses.

Thus it will be appreciated by those skilled in the art that the present invention is not restricted to the particular preferred embodiments described with reference to the drawings, and that variations may be made therein without departing from the scope of the present invention as defined in the appended claims and equivalents thereof.

What is claimed is:

1. A computer implemented generalized method of reconciling financial transactions on a computer having at least a first dataset and a second dataset, comprising:
    extracting features of each of the financial transactions for which reconciliation is to be attempted, wherein extracting features comprises (1) tokenizing text in unstructured text database fields and treating each word output by text tokenization as a transaction feature, and (2) treating values in non-unstructured-text database fields as features in their own right;
    weighting the extracted features according to their distinctiveness to each of the financial transactions wherein weighting the extracted features comprises using information theory to derive a weighted value specific to a transaction and feature, such that the weighted value is greater the more distinctive the transaction and feature are in combination with one another;
    listing pairs of financial transactions which are candidates for reconciliation with reference to the weighted features, wherein listing pairs comprises constructing a Cartesian product of the at least first and second datasets being reconciled;
    calculating pairwise similarities for each of the candidate pairs, wherein calculating pairwise similarities comprises (1) constructing an n-dimensional Euclidean vector for each transaction, where n is a count of distinct features of all transactions, (2) populating the vector with numerical values corresponding to the weighted values specific to the transactions and features, and populating the vector with zero where transactions and features do not co-occur, and (3) calculating cosines between pairs of vectors;
    calculating pairwise correlations between pairs of transactions, wherein calculating correlations comprises (1) treating the populated n-dimensional vectors as statistical distributions, and (2) applying a statistical correlation function to pairs of statistical distributions to yield a single measure of correlation per pair; and
    reconciling pairs of financial transactions, wherein reconciling pairs comprises matching pairs of transactions for which (1) the calculated pairwise correlation exceeds a critical value determined by the statistical correlation function and a user-specified confidence level, and (2) neither transaction in any matched pair participates in other pairs with larger calculated pairwise similarity values;
    wherein the extracting, weighting, listing, calculating and reconciling are performed by the computer and regardless of the number or type of transactions and regardless of the number or type of features associated with each transaction, and require no further external heuristics or business rules.

2. The computer implemented generalized method of claim 1, wherein tokenizing text further comprises a regular-expressions Regex.Split method used in conjunction with a non-word character delimiter "\w".

3. The computer implemented generalized method of claim 1, wherein weighting features further comprises a Pointwise Mutual Information weighting function according to the following relation: $w(i,j)=\log(p(i|j))-\log(p(i))$, where i represents a feature variable, j represents a transaction variable, $w(j,i)$ represents a weighted value of feature i in transaction j, $p(i|j)$ represents the probability of selecting feature i conditional upon transaction j, and $p(i)$ represents the probability of selecting feature i in the entire population, and where $w(i,j)$ is zero if feature i is not associated with transaction j.

4. The computer implemented generalized method of claim 1, wherein constructing the Cartesian product comprises a blocking function whereby pairs of transactions that do not have equal and opposite monetary values are excluded from the Cartesian product.

5. The computer implemented generalized method of claim 1, wherein the statistical correlation function is one of Spearman's rho or Pearson's rho.

6. A generalized method of reconciling financial transactions on a computer having at least a first dataset and a second dataset, comprising the steps of:
    extracting features of each of the financial transactions for which reconciliation is to be attempted to transform source financial data into transaction vectors, wherein extracting features comprises (1) tokenizing text in unstructured text database fields and treating each word output by text tokenization as a transaction feature, and (2) treating values in non-unstructured-text database fields as features in their own right;
    weighting the extracted features according to their distinctiveness to each of the financial transactions to transform the transaction vectors into transaction vectors in which at least some cells contain numerical values, wherein weighting the extracted features comprises using information theory to derive a weighted value specific to a transaction and feature, such that the weighted value is greater the more distinctive the transaction and feature are in combination with one another;
    listing pairs of financial transactions which are candidates for reconciliation with reference to the weighted features to transform source financial data into a transaction-by-transaction matrix, wherein listing pairs comprises constructing a Cartesian product of the at least first and second datasets being reconciled;
    calculating the pairwise similarities for each of the candidate pairs to transform the transaction-by-transaction matrix into a transaction-by-transaction matrix whose cells contain numerical values, wherein calculating pairwise similarities comprises (1) constructing an n-dimensional Euclidean vector for each transaction, where n is a count of distinct features of all transactions, (2) populating the vector with numerical values corresponding to the weighted values specific to the transactions and features, and zero where transactions and features do not co-occur, and (3) calculating cosines between pairs of vectors; and
    reconciling pairs of financial transactions so as to transform the transaction-by-transaction matrix into an annotated list of transactions showing which transactions in one source dataset are reconciled to which transactions in another source dataset, wherein reconciling pairs comprises matching pairs of transactions for which (1) the calculated pairwise correlation exceeds a critical value determined by the statistical correlation function and a user-specified confidence level, and (2) neither transaction in any matched pair participates in other pairs with larger calculated pairwise similarity values;
    wherein the extracting, weighting, listing, calculating, and reconciling are performed by the computer and regardless of the number or type of transactions and regardless of the number or type of features associated with each transaction, and require no further external heuristics or business rules.

7. The method of financial account reconciliation of claim 6, wherein tokenizing text further comprises a regular-expressions Regex.Split method used in conjunction with a non-word character delimiter "\w".

8. The method of financial account reconciliation of claim 6, further providing instructions that, when executed by a computer, will cause the computer to perform further operations, comprising: measuring the distinctiveness of particular features in association with particular financial transactions.

9. The method of financial account reconciliation of claim 6, wherein constructing the Cartesian product comprises a blocking function whereby pairs of transactions that do not have equal and opposite monetary values are excluded from the Cartesian product.

10. The method of financial account reconciliation of claim 6, wherein the statistical correlation function is one of Spearman's rho or Pearson's rho.

11. A generalized system for reconciling financial transactions having at least a first dataset and a second dataset, comprising:
    a computer having the financial transactions to be reconciled and stored thereon;
    the computer extracting features of each of the financial transactions for which reconciliation is to be attempted, wherein extracting features comprises (1) tokenizing text in unstructured text database fields and treating each word output by text tokenization as a transaction feature, and (2) treating values in non-unstructured-text database fields as features in their own right;
    the computer weighting the extracted features according to their distinctiveness to each of the financial transactions wherein weighting the extracted features comprises using information theory to derive a weighted value specific to a transaction and feature, such that the weighted value is greater the more distinctive the transaction and feature are in combination with one another;
    the computer listing pairs of financial transactions which are candidates for reconciliation with reference to the weighted features, wherein listing pairs comprises constructing a Cartesian product of the at least first and second datasets being reconciled;
    the computer calculating pairwise similarities for each of the candidate pairs, wherein calculating pairwise similarities comprises (1) constructing an n-dimensional Euclidean vector for each transaction, where n is a count of distinct features of all transactions, (2) populating the vector with numerical values corresponding to the weighted values specific to the transactions and features, and populating the vector with zero where transactions and features do not co-occur, and (3) calculating cosines between pairs of vectors;
    the computer calculating pairwise correlations between pairs of transactions, wherein calculating correlations comprises (1) treating the populated n-dimensional vectors as statistical distributions, and (2) applying a statistical correlation function to pairs of statistical distributions to yield a single measure of correlation per pair; and the computer reconciling pairs of financial transactions, wherein reconciling pairs comprises matching pairs of transactions for which (1) the calculated pairwise correlation exceeds a critical value determined by the statistical correlation function and a user-specified confidence level, and (2) neither transaction in any matched pair participates in other pairs with larger calculated pairwise similarity values;

wherein the extracting, weighting, listing, calculating and reconciling are performed regardless of the number or type of transactions and regardless of the number or type of features associated with each transaction, and require no further external heuristics or business rules.

* * * * *